J. E. LANDRY.
BRAKING MECHANISM FOR AUTOMOBILES.
APPLICATION FILED AUG. 30, 1916.
1,227,805.
Patented May 29, 1917.
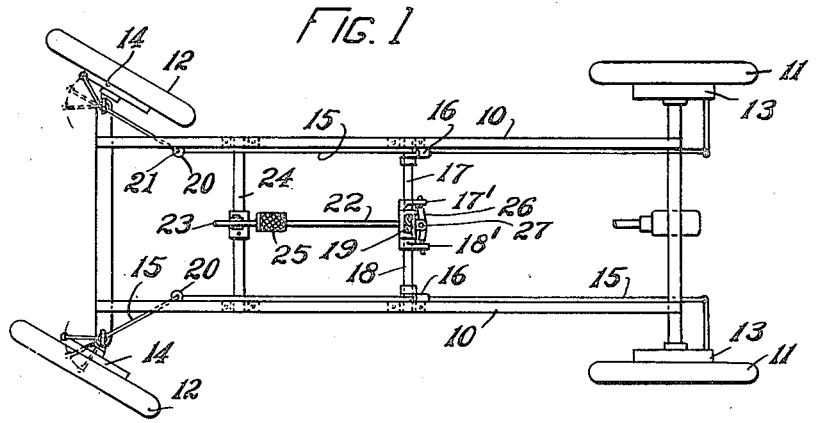
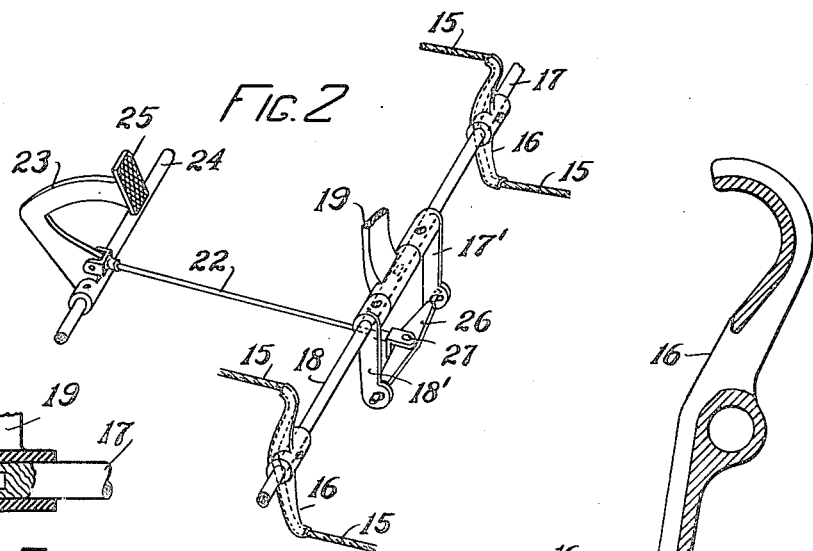
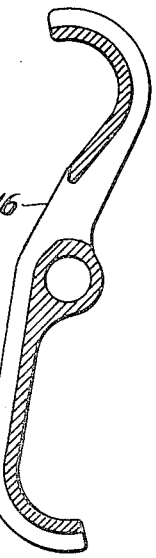
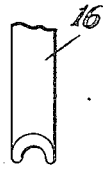
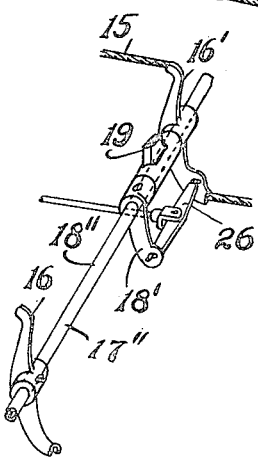
INVENTOR
JOSEPH E. LANDRY
BY
Mitchell, Chadwick Kent
ATTYS.

UNITED STATES PATENT OFFICE.

JOSEPH EUCLIDE LANDRY, OF NEW BEDFORD, MASSACHUSETTS.

BRAKING MECHANISM FOR AUTOMOBILES.

1,227,805.  Specification of Letters Patent.  Patented May 29, 1917.

Application filed August 30, 1916. Serial No. 117,793.

*To all whom it may concern:*

Be it known that I, JOSEPH EUCLIDE LANDRY, a citizen of the United States, residing at New Bedford, in the county of Bristol and State of Massachusetts, have invented new and useful Improvements in Braking Mechanism for Automobiles, of which the following is a specification.

This invention relates to improvements in braking devices for automobiles.

More particularly it relates to means for arranging and applying brakes in such a way as to minimize the danger of skidding, to dispose the braking power effectively and economically, and to apply it upon all four of the wheels simultaneously and with an equality of force or otherwise as the designer may wish. In my patent granted on December 31, 1907, No. 875,358, I disclosed a practicable and economical method of applying brakes to the steering wheels of an automobile, notwithstanding the difficulties inherent in a construction wherein wheels are mounted on pivots. Since that time a lever worked by hand has been used for applying brakes to the steering wheels and the usual hand or foot lever for the rear brake, but so far as I am aware no feasible method has been known for applying the steering wheel brakes uniformly with those on the driving wheels. Whether all brakes are applied at once, or with equal frictional effect, is a matter depending wholly upon the knowledge, attention and skill of the operator. It will be understood that when a car is under headway the application of brakes to steering wheels, if they happen to be turned and pointing in a direction different from that in which the car as a whole is moving, would be effective only indirectly toward arresting the movement of the car, for the wheels might cease their rotation and yet might slip on the ground in the direction in which the car is moving; also, that, if the front wheels were sufficiently turned it might be a very material help to have additional brakes on the driving wheels or mechanism. Such an emergency sometimes happens when the car is turned sharply to one side and the brakes are simultaneously applied in order to avert an impending collision. In such a case it is particularly desirable that all four brakes should be applied at once, which, however, may be impossible if the driver has also and at the same instant to disconnect his clutch, to steer the wheels, and to operate the two different sets of brakes for steering and driving wheels with the two separate levers, either foot or hand levers. The present invention provides means adapted to this situation, whatever be the degree to which the steering wheels are turned, so that each brake takes effect at an instant which automatically is the same for all of the brakes; and in the case of the steering wheels this is true whichever one of them be turned toward or away from the point of brake control, and however far it be thus turned. Furthermore, the leverage with which the brake is applied may be made different for any one or pair of the brakes according to a predetermined design. The details of one form of the invention by which these results are attained are set forth hereinafter, but the invention may be applied in various forms, within the scope of the appended claims; and it is intended to have the patent cover by suitable expression in the claims whatever features of patentable novelty exist in the invention disclosed.

The objects of the invention are accomplished, in the form here illustrated, by providing a flexible connection from the brake on each movable steering wheel to the brake on one of the other pair of wheels, which connection, as illustrated, is in the form of a cable passing along a lever located between the connected brakes and extending transversely of the general direction of the cable. This lever is fulcrumed at its middle part, which part also has a hole big enough for the cable to pass through. The cable coming from one of the brakes to one end of the lever passes along it on its farther side to the hole, through the hole to the nearer side, which is the remote side from the standpoint of the other brake, and thence goes on to the lever's end and around it to the said other brake. Turning of this lever about its fulcrum tightens or releases the two brakes; but, owing to the flexibility of the cable and the provision for its slippage along said lever, neither brake is applied with any considerable force until the cable leading from the lever to each is taut, whereupon further movement of the lever applies both simultaneously. A cable and lever is thus arranged on each side of an automobile chassis, and the levers at each side are adapted to be thus turned by a lever actuated by the driver of the car and connected with them through any suitable equalizing device. As it may be necessary to apply the brakes when the front wheels are turned to the right or to the left, and so are farther from or nearer to the place where the driver acts, the slippage of the cable along the lever occurs in either direction as much as is needed before the braking action takes effect; and owing to the equalizing device between the two levers the cable whose connection to a brake on a steering wheel is at the moment the farther away from its connection to the driving wheel brake, so that it becomes taut more quickly, nevertheless does not begin to be applied effectively until continued movement of the driver's lever has made the other cable equally taut, after which time both cables are shortened simultaneously and all four brakes come into action simultaneously on the wheel that is turned in, the wheel that is turned out, and on the two wheels which are not turned. The principles and construction by which this may be embodied in workable apparatus will be understood by those skilled in the art after reference to the following description and to the accompanying drawings, in which Figure 1 is a plan, somewhat diagrammatic, of the chassis, including wheels and steering gear of an automobile;

Fig. 2 is an isometric view of some of the operating parts on a larger scale;

Fig. 3 is a side elevation of one of the cable levers in medial section on a still larger scale;

Fig. 4 is an end view of a fragment of the same;

Fig. 5 is a rear elevation of a detail of Fig. 2, enlarged; and

Fig. 6 is a view similar to Fig. 2, of a modification.

Referring to the drawings, in Fig. 1 is seen a representation of the chassis of an automobile, made somewhat out of proportion in order that parts may be shown on a larger scale, and with the various parts indicated more or less diagrammatically, in which the side members of the chassis are marked 10, the rear wheels, 11, the front or steering wheels 12, the rear brakes 13, and the brakes on the steering wheels 14. Leading from the brake on the steering wheel on one side of the chassis to the brake on the rear axle on the same side is a cable 15. A similar cable 15 leads from the other steering wheel to the brake on the other rear wheel. On the forward part of the chassis near each wheel and also if desired, although not illustrated, on the rear part near each wheel is a simple hanger 20 having an eye hole 21 through which the cable passes and by which it is held in place and guided to the adjacent brake which it is to operate. Engaging an intermediate part of each of these cables is a lever 16, the shape of which is seen more fully in Fig. 2 and in Figs. 3 and 4, one of which levers, as illustrated, is fast on a rod 17 and the other fast on a rod 18. Rods 17 and 18 are arranged end to end on the same axis transversely of the chassis. They are supported in suitable bearings, so that they can rock or turn on their axes, and are separate from each other so that they can turn independently of each other. In Fig. 2 a hanger 19 is indicated which holds and controls the bearing for the adjacent ends of these two rods. Fast on the rods 17, 18 are two arms 17', 18', one on each, which, as illustrated, are arranged projecting vertically downward. They can be engaged and pulled by an equalizing lever 26 extending transversely and pivoted in its middle at 27 on a vertical axis to a rod 22 which is connected to an arm 23 projecting from and fast to a cross shaft 24 that is suitably journaled and is adapted to be turned more or less by pressure of the person driving the car upon a pedal 25. This pedal, cross rod and connecting rod, 25, 24, 22, are so arranged that forward pressure of the driver on the pedal 25 draws the rod 22 forward. The equalizing lever 26 thereon is adapted, at one end to engage the depending arm 17', and at the other end to engage at an equal distance from its fulcrum 27 the similar depending arm 18'. The lever 16 projects in opposite directions more or less vertically from its fulcrum, which is virtually the shaft 17 or 18, the location of which is indicated by the hole in Fig. 3. This lever in cross section has the general form of a U, as seen in Fig. 4, so as to receive the cable as illustrated in Fig. 2. The open part of the U is on opposite sides of the lever on its opposite arms. On each part of the lever it is directed away from that direction in which the cable on that part of the lever extends to its brake. Moreover the lever is curved at its extremities toward the direction in which the cable on that part of the lever extends toward its brake. The bottom and sides of the U are smooth so that the cable can slip readily thereon. At a place adjacent to the fulcrum the two U-forms overlap each other, and the bottoms of the two U's are omitted, so that a hole through the lever is formed, through which the cable passes freely, from the bottom of one U facing in one direction, to the bottom of the other U facing in the other direction. The reach of these arms from the fulcrum may be identical, as is illustrated, or may be diverse, as may be desired by the designer. The ends of the lever are preferably curved so far that they point in opposite directions.

When the apparatus is in operation a pressure of the driver on the pedal 25 is transmitted to the rod 22 and to the fulcrum of the equalizing lever 26 which moves to the left in Fig. 2, carrying either or both ends of the lever with it according to whether either end meets resistance in swinging its arm 17′ or 18′. If the cable 15 be slack on either side its lever 16 can turn easily, slipping over the cable as much as necessary; and it will so turn in response to the initial pressure on the arm 17′ or 18′ until the slack is taken up when the resistance thus encountered will stop further movement of the arm 17′ or 18′ until the other arm 17′ or 18′ has been likewise stopped by the taking up of slack of the other cable by its lever 16, after which both arms 17′ and 18′ will move in unison, turning their levers 16 in unison. As neither lever 16 is turned with much power until the slack of both cables is taken up, no appreciable effect is produced upon the brakes until then; but when such lever is afterward turned it operates the two brakes to which it is connected, the pull being proportional to the length of its arms, so that by this means, by making one of the arms longer than the other, the pull on either brake may be made different from that on the other, although applied by the same single motion of the operator, a result which may be desired owing to the different size or leverage or other conditions affecting brakes on steering wheels and brakes on driving wheels. As the lever 16 is free to slip in either direction over the cable 15 the two sides of the cable 15 become taut simultaneously; and as the rod 12 is not effective to pull either arm 17′ or 18′ against resistance until they resist its pull equally, at which time it pulls both equally, the motion of the car driver in pushing the pedal 25 forward applies to all four brakes simultaneously and does this regardless of whether the distance from the cross rod 17 to the place where the cable is attached to the brakes on the steering wheel is longer because that wheel is turned outward or shorter because the wheel is turned inward. The slippage of the cable and lever automatically takes care of the difference in slackness of cable, so that neither brake takes effect until the cables are equally ready.

While the foregoing illustrates one method of applying the invention, the invention is by no means limited to that, and often the particular way of applying it depends upon the peculiarities of design which happen to be embodied in the particular car to which it is to be applied. There may, for example, be no room, or the parts may not be suitably arranged, to have the hanger for a bearing, the divided shaft 17, 18 and equalizing lever connections in the middle of the car as illustrated in Fig. 2. The parts concerned or their equivalents can equally well be placed at the side; and Fig. 6 illustrates a convenient means of doing that. In this case the rod 17″ extends across the full width of the car as one integral piece. One of the levers 16 is fast on it while the other lever, here marked 16′, is loose upon it and in its lower portion performs the function of the arm 17′ of Fig. 2 by engaging one end of the equalizing lever 26. The arm 18′ is fixed on the shaft 17 adjacent to the cable lever 16′. Where the driver's brake pedal 25 is at one side of the car this arrangement makes a very compact design. The methods here illustrated of applying the invention may be embodied in other ways without departing from the scope of the invention.

I claim as my invention:—

1. The combination, in a vehicle, of four wheels, two of them being at each end and those at one end being swiveled on separate pivots constituting steering wheels; a brake on each wheel; and means to operate all four brakes simultaneously comprising two cables connecting front and rear wheels; an S-lever for each, traversed and medially penetrated thereby with a slipping contact; a single actuating means; and an equalizer connecting it with both levers.

2. The combination, in a vehicle, of four wheels, two of them constituting steering wheels; a brake on each steering wheel, braking means for the other wheels, and cables connected from the steering wheel brakes thereto, one for each steering wheel; means to take up slack in each cable independently of the other; an equalizer operating said slack taking means, and actuating means.

3. The combination, in a vehicle, of four wheels, two of them being at each end and those at one end being swiveled on separate pivots, constituting steering wheels; brakes for each of the wheels; a connection from each steering wheel brake to the brake of the other wheel on the same side of the vehicle independent of the brake connection between wheels on the other side of the vehicle, and means for applying the two brakes on one side simultaneously with each other.

4. The combination, in a vehicle, of four wheels, two of them constituting steering wheels; brakes for each of the wheels; a connection from each steering wheel brake to the brake of the other wheel on the same side of the vehicle independent of the brake connection between wheels on the other side of the vehicle; means for taking up slack in each such connection, comprising a lever for each side, adapted to turn on its fulcrum independently of the other and to allow slippage of said connection past it; a single actuating means for both, and an equalizing connection whereby they take up slack independently and when tight apply the brakes together.

5. The combination, in a vehicle, of four wheels, two of them being at each end and those at one end being swiveled; a brake on each wheel, a cable connection between each pair of brakes on the same side of the vehicle; a cross rod in the middle part of the vehicle; levers supported thereon, one engaging each of said connections and movable separately from the other about the axis of the cross rod as its fulcrum to tighten said connection; an actuating device therefor and equalizing means, each said lever being arranged so that its cable approaching from each brake passes over the end of the lever, to and along the remote side thereof, and through the middle part thereof, with a slipping contact.

6. The combination, in a vehicle, of four wheels, two of them being at each end and those at one end being swiveled; a brake on each wheel, a cable connection between each pair of brakes on the same side of the vehicle; a cross rod in the middle part of the vehicle; levers supported thereon, one engaging each of said connections and movable separately from the other about the axis of the cross rod as its fulcrum to tighten said connection; an actuating device therefor and equalizing means, each said lever being arranged so that its cable approaching from each brake passes over the end of the lever, to and along the remote side thereof, and through the middle part thereof, with a slipping contact; the arms of said lever being of different length from the fulcrum to where the cable leaves the lever, thereby giving differential leverage on the brakes.

7. The combination, in a vehicle, of four wheels, two of them being at each end and those at one end being swiveled; a brake on each wheel, a cable connection between each pair of brakes on the same side of the vehicle; a cross rod in the middle part of the vehicle; levers supported thereon, one engaging each of said connections and movable separately from the other about the axis of the cross rod as its fulcrum to tighten said connection; an actuating device therefor and equalizing means, each said lever being arranged so that its cable approaching from each brake passes over the end of the lever, to and along the remote side thereof, and through the middle part thereof, with a slipping contact; said lever having arms of U-shaped cross section, facing oppositely, with the bottoms of the U interconnected in the middle part for passage of the cable.

8. The combination in a vehicle having four wheels with brakes on each, of a cable on each side connecting front and rear brakes thereon; a fulcrum rod extending transversely of the middle portion of the vehicle; an equalizing device thereon at each side of the vehicle for the cable on that side, said devices being capable of action independently of each other; and an equalizing device on said cross rod adapted to turn each of said side equalizing devices about its axis; and actuating means.

9. The combination in a vehicle having four wheels with brakes on each, of a cable on each side connecting front and rear brakes thereon; a fulcrum rod extending integrally transversely of the middle portion of the vehicle; an equalizing device thereon for each cable, one being fast and one being loose on said fulcrum rod; an equalizing device on said cross rod adapted to turn each of the cable equalizers about its axis, and actuating means.

Signed by me at Boston, Mass., this 14th day of December, 1915.

JOSEPH EUCLIDE LANDRY.

Witnesses:
EVERETT E. KENT,
ANNA B. LINDSAY.